Dec. 27, 1949  C. F. SIEFKEN  2,492,897
CORN PICKER HAVING DOUBLE DISCHARGE
HUSK-REMOVING BLOWER
Filed March 30, 1949  2 Sheets-Sheet 1

Inventor
Carl F. Siefken

By *Clarence A. O'Brien
and Harvey B. Jacobson*
Attorneys

Dec. 27, 1949     C. F. SIEFKEN     2,492,897
CORN PICKER HAVING DOUBLE DISCHARGE
HUSK-REMOVING BLOWER
Filed March 30, 1949     2 Sheets-Sheet 2
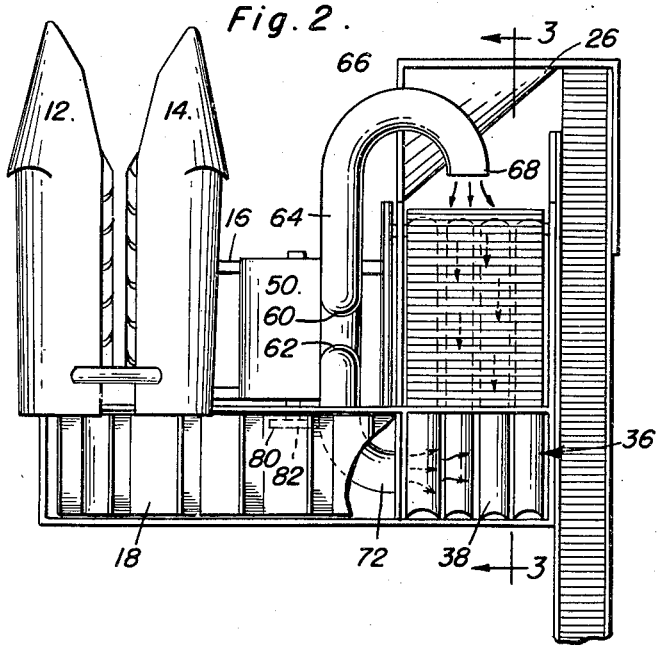
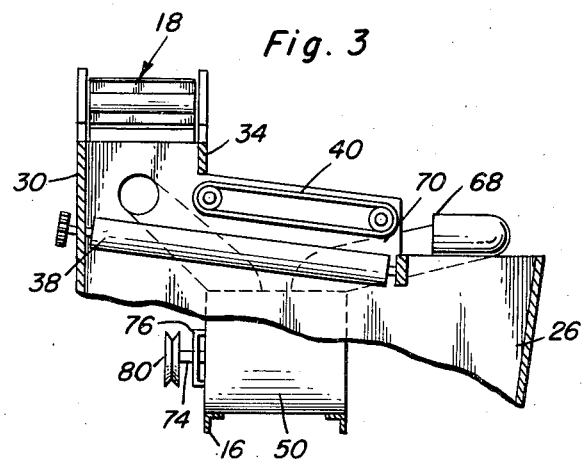
Inventor
Carl F. Siefken
By *Clarence A. O'Brien and Harvey B. Jacobson*
                                 Attorneys

UNITED STATES PATENT OFFICE 2,492,897

CORN PICKER HAVING DOUBLE DISCHARGE HUSK-REMOVING BLOWER

Carl F. Siefken, Columbus, Nebr.

Application March 30, 1949, Serial No. 84,282

2 Claims. (Cl. 130—5)

This invention relates to a blower unit for corn pickers and is a continuation of my pending application, Serial No. 652,466, filed March 6, 1946, now abandoned.

The primary object of this invention is to effectively and completely blow trash and extraneous husks from the shucking bed of a corn picker, so that the corn is discharged into a bin or receptacle, separated from the husks and trash.

Another important object of this invention is to employ crisscross air currents for corn shucking purposes and to direct the currents over the shucking bed, so that the air currents aid in the shucking operation and remove trash and extraneous husks from the corn and from the shucking bed.

Another object of this invention is to provide a double-duty blower for corn pickers which will blow air across the upper end of a shucking bed and will simultaneously blow air upwardly along the length of the shucking bed.

Another important object of this invention is to provide a blower attachment for a conventional corn picker, which can be easily mounted on the corn picker, operated by interconnected operating means and inexpensively and efficiently maintained and employed.

These and ancillary objects and structural features of merit are attained by this invention, a preferred embodiment of which is set forth in the following description and illustrated in the accompanying drawings, wherein:

Figure 2 is a top plan view of the picker and blower attachment therefor; and

Figure 3 is a vertical sectional view taken substantially on line 3—3 of Figure 2.

Figure 1:
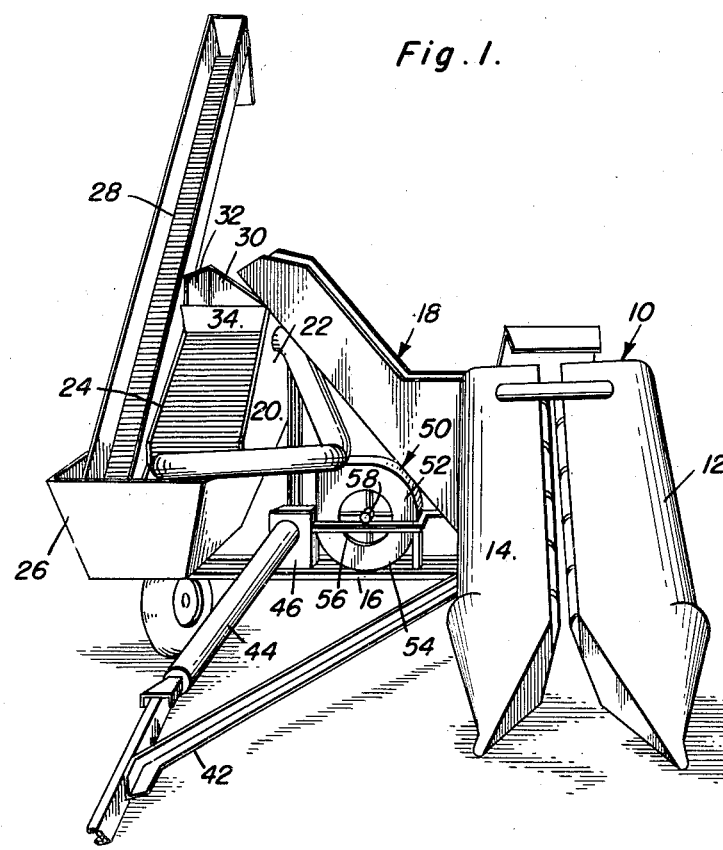
Figure 1 is a front elevational view of a conventional corn picker, illustrating a blower, constructed in accordance with the principles of this invention, operatively mounted thereon.

Referring now to the drawings, a corn picker 10 of conventional construction is illustrated and is provided with shucking rolls 12 and 14 arranged in substantial parallelism and carried by a wheeled frame 16, so that the lower ends thereof project forwardly of the frame. An elevator 18 is disposed at right angles to the upper or discharge ends of the picker rolls and is directed upwardly and outwardly therefrom. A housing 20 is disposed at right angles to the upper discharge end of the elevator 18 and is positioned parallel with the picker rolls and transversely spaced therefrom. The housing or casing 20 includes opposed side walls 22 and 24 which have their upper edges sloped inwardly and downwardly toward the lower end of the housing which defines a bin or receptacle 26. An elevator 28 is associated at its lower end with the bin and extends upwardly therefrom in the opposite direction from the picker rolls. An upwardly standing rear wall 30 connects the opposing side walls 22 and 24 of the housing 20 and an end wall 32 is positioned at right angles thereto in opposition to the open discharge end of the elevator 18. An apron or baffle plate 34 is disposed parallel with the end wall 30 and connects the side walls 20 and 24. A shucking bed 36 is disposed within the housing 20 between the side walls and is formed from a plurality of parallel, downwardly and inwardly inclined rolls 38, which are disposed in contact with each other to pinch the husk from the ears of corn discharged thereon. The upper end of the husking bin is disposed between the end wall 30 and the apron 34, while the lower end terminates in a plane below the upper end and adjacent to the bin 26. An endless conveyor 40 is operatively disposed between the upper edges of the side walls 22 and 24 and is positioned above the shucking bed to retain the ears of corn on the rolls, as the ears gravitate downwardly into the bin. A forwardly extending tongue or draft connection 42 is pivotally carried by the frame and extends forwardly thereof, so that the frame may be connected to a tractor or similar drafting vehicle for drawing the corn picker over the fields. A suitable power take-off (not shown) will be connected between the tractor and corn picker for operating the same in association with a driven unit 44 and a gear box 46. The various elevators, shucking bed and picker rolls will be operated by chain drives or gears or the like transmission systems associated with the gear box 46.

The foregoing conventional corn picker is drafted over the fields by a tractor or similar vehicle and the ears of corn are picked up by the picker rolls and carried by the elevator 18 to the upper end of the shucking bed. It is to be noted that the ears of corn are discharged onto the upper end and are prevented from falling off by the walls 30 and 32. The apron 34 functions to retain the ears of corn between the shucking bed and the conveyor 40. The husks are pinched from the ears of corn by the rolls 38 forming the shucking bed and are discharged into the bin 26, where they are removed automatically by the elevator 28.

It is the primary aim and purpose of this invention to improve the husking operation and to render the same more efficient and more expeditiously carried out by directing air blasts or air currents along and across the shucking bed, so that the trash and extraneous husks will be separated from the corn and discharged into the bin or receptacle 26.

In this respect, a sirocco-type blower unit 50 is provided and includes an upper arcuate section 52 and a lower arcuate section 54 suitably joined together and mounted on the frame 16. The upper and lower sections are provided with central openings, so that the opposing sides of the blower housing are formed with longitudinally aligned air inlet openings 56. A fan 58 is rotatably mounted within the blower housing and is adapted to blow air currents therefrom through the split discharge outlets 60 and 62 at the upper end. A tube or conduit 64 is connected to the outlet 60, and is provided with a U-shaped extremity 66 which may be laid on the upper edge of the bin or may be suitably disposed therethrough, so that the open extremity 68 thereof is disposed in substantial alignment with the opening 70 between the conveyor and husking bed. A similar conduit 72 is connected with the outlet 62 and extends through the wall 22 at the upper end of the shucking bed. The fan 58 is rotatably mounted on a shaft 74 rotatably journaled in the housing and centrally positioned within the side openings. The axle or shaft is mounted in a conventional manner in bearings 76 and is provided at one end with a pulley or sprocket wheel 80. A belt or similar connecting means 82 is carried by the pulley 80 and associated with a similar pulley or gear extending from the gear box 46.

Thus, the blower will be rendered operative when the shucking bed rolls are rotated and will aid in removing the trash and extraneous husks from the shucking bed so that only clean ears of corn are allowed to drop from the shucking bed into the bin.

Inasmuch as other purposes can be served by this device and various modifications can be carried out, limitation is sought only in accordance with the accompanying claims.

Having described the invention, what is claimed as new is:

1. In a corn picker including a wheeled frame, a downwardly inclined shucking bed mounted on the frame, an inclined elevator on said frame and positioned transversely to the axis of the shucking bed, said elevator having its upper end extending above the upper end of the shucking bed to discharge corn on the bed, the improvement which comprises a blower housing mounted on the frame, a fan rotatably journalled in the housing, split air discharge outlets for said housing, conduits communicating at one of their ends with the outlets, one of said conduits terminating at the upper end of the shucking bed and disposed transversely thereto and underlying the upper end of the elevator and the other of said conduits terminating at the lower end of the bed in longitudinal alignment therewith.

2. In a corn picker including a wheeled frame, a downwardly inclined shucking bed mounted on the frame, an inclined elevator on said frame and positioned transversely to the longitudinal axis of the shucking bed, said elevator having its upper end extending above the upper end of the shucking bed to discharge corn thereon; the improvement which comprises a blower unit mounted on the frame, split air discharge outlets for said housing, conduits communicating with said outlets, one of said conduits terminating at the upper end of the bed and underlying the upper end of the elevator, said conduit having its end disposed transversely to the bed and positioned directly under the elevator, the other of said conduits terminating at the lower end of the shucking bed and disposed in longitudinal alignment with the bed, and a transverse baffle plate at the upper end of the bed and cooperating with the walls of the frame to define a chamber into which the corn is discharged by the elevator and into which air from the first conduit is discharged.

CARL F. SIEFKEN.

REFERENCES CITED

The following references are of record in the file of this patent:

UNITED STATES PATENTS

| Number | Name | Date |
|---|---|---|
| Re. 1,545 | Trimmer | Sept. 29, 1863 |
| 1,155,173 | Tschantz | Sept. 28, 1915 |
| 1,317,736 | Smolley | Oct. 7, 1919 |
| 1,974,309 | Jones | Sept. 18, 1934 |
| 2,076,523 | Ballack et al. | Apr. 13, 1937 |
| 2,210,973 | Coultas et al. | Aug. 13, 1940 |
| 2,379,802 | Hyman | July 3, 1945 |
| 2,420,543 | Johnson et al. | May 13, 1947 |
| 2,443,039 | Johnson | June 8, 1948 |